United States Patent [19]

Freimanis

[11] 3,740,486

[45] June 19, 1973

[54] TELEPHONE SUBSCRIBER LINE DIAL PULSE DETECTOR CIRCUIT

[75] Inventor: Laimons Freimanis, Chicago, Ill.

[73] Assignee: Bell Telephone Laboratories, Incorporated, Murray Hill, N.J.

[22] Filed: Dec. 1, 1971

[21] Appl. No.: 203,585

[52] U.S. Cl. .......... 179/18 FA

[51] Int. Cl. .......... H04m 3/22

[58] Field of Search .......... 179/18 FA, 18 F

[56] References Cited

UNITED STATES PATENTS

| | | | |
|---|---|---|---|
| 3,156,778 | 11/1964 | Cirone | 179/18 |
| 3,515,809 | 6/1970 | Herter | 179/18 |
| 3,655,920 | 4/1972 | Laane | 179/18 |

*Primary Examiner*—Kathleen Claffy
*Assistant Examiner*—Kenneth D. Baugh
*Attorney*—W. L. Keefauver and R. B. Ardis

[57] ABSTRACT

A service circuit arrangement for detecting telephone subset hookswitch and dialing operations through a subscriber line-transmission network transformer coupling. Applicable particularly to solid state network systems, the circuit provides for the detection of the impedance difference presented to an alternating sensing current by the subscriber line during closed and open circuit states. The past necessity of providing detection circuits on a per-line basis in view of the direct current blocking transformers is thus eliminated.

3 Claims, 2 Drawing Figures

TELEPHONE SUBSCRIBER LINE DIAL PULSE DETECTOR CIRCUIT

BACKGROUND OF THE INVENTION

This invention relates to service circuits for telephone switching systems and particularly to such circuits adapted to detect subscriber line circuit operations in systems employing semiconductor switching networks.

Telephone switching systems, including the more recent electronic systems, have in the past generally employed space division networks through which transmission paths are selectively established by means of metallic contact crosspoints. To date these crosspoints have proved satisfactory from the standpoint of reliability and low contact resistance. Metallic crosspoints and the subscriber line-network coupling have in the past also transmitted the direct current present in a subscriber line upon actuation of the hookswitch and the pulsed direct current present as a result of the operation of the dial contacts of the subset. In recent years, however, the demand for faster response time for network crosspoints as well as the advantages inherent in circuit integration have turned the attention in the art from metallic contact relays to semiconductor switching devices as possible crosspoint elements. These elements, such as PNPN thyristors, for example, have shown considerable promise and offer significant advantages over metallic crosspoints from the viewpoints of size, speed of operation, and cost, to name several. Other properties have, however, limited their application and in the present state of the semiconductor art, specific problems must be overcome before solid state crosspoints find general acceptance in large-scale telephone switching networks.

Although other coupling arrangements are known, in systems where balanced networks are employed, the subscriber lines are conventionally transformer-coupled to the solid state network terminals. This is done for isolation purposes and to achieve the required longitudinal balance. Additionally, a center-tapped coupling transformer provides a means for applying holding current for the active thyristor crosspoints. This transformer coupling, conventionally designed to pass primarily voice frequencies down to 200 Hz, presents one of the limitations imposed by a thyristor network, i.e., the inability of the transformers to transmit direct current. In known solid state network systems not able to sense through the network typical negative 48 volt direct current dial pulses or the steady state off-hook current, means are usually employed on a per-line basis for the detection of subscriber originated switching operations. Manifestly, the costs of providing individual subscriber line service circuitry are substantial and tend to mount as stricter design margins are imposed to guarantee maximum reliability and minimum delay in providing customer service. It will thus be appreciated that any reduction in these costs will serve to enhance interest in a transformer-coupled solid state switching network as an attractive replacement for prior art metallic contact networks.

One advantageous approach to detecting subscriber hookswitch closures specifically during a ringing cycle is taught in a copending application of the present inventor, Ser. No. 197,471, filed Nov. 10, 1971. In the novel arrangement there disclosed the number of ring-trip detection circuits is substantially reduced by assigning a small number on an individual basis by means of a concentrator network to the called lines of the office. The transformer-coupled transmission network is thus avoided without the necessity of resorting to a per-line solution of the detection problem. In particular telephone switching contexts, on the other hand, it may be advantageous to revert to the conventional practice of routing subscriber line signals through the transmission network. In systems providing for remote operator locations, such as the Bell System Traffic Service Position System, for example, the network is designed for the exclusive transmission of voice frequencies, no ringing or subscriber response signals being transmitted therethrough. In these systems, occasions still arise where it may be necessary to detect subscriber line dial pulses through the network without warranting per-line or concentrator assigned detection circuitry where the network is transformer-coupled.

Accordingly, it is an object of the present invention to sense through a transformer-coupled transmission network subscriber initiated line circuit closures and interruptions such as subscriber dialing operations.

It is another object of this invention to provide a new and novel telephone subscriber dial pulse detection circuit.

Also an object of this invention is the transmission of telephone subscriber line originated signals through the switching network without employing direct current access to the line.

SUMMARY OF THE INVENTION

The foregoing and other objects of this invention are realized in one specific illustrative embodiment thereof in which a telephone transmission switching network having solid state crosspoint elements is transformer-coupled to both the subscriber lines and the dial pulse detection circuits. A preestablished conducting path through the switching network between any subscriber line and an assigned dial pulse detection circuit thus has two points which block direct current signals. In accordance with the present invention, the operational state of a subscriber line is sensed by the detection circuits through such a transformer-coupled path by detecting through it changes occurring in the subscriber line impedance. When the dial contacts (or hookswitch contacts) are open, the subscriber line, although presenting an open circuit, presents a relatively high impedance to alternating current due to the inherent capacitance of the line. When the dial contacts (and hookswitch contacts) are closed, the line is terminated in the subset resistance, typically approximately 200 ohms. The impedance difference is then manifested by suitable means for measuring the alternating sensing current in the sensing circuit. The relatively high impedance presented by an open subscriber line circuit compared with its low impedance when both hookswitch and dial contacts are closed has, in the practice of this invention, created sufficient current differential for distinguishing between the two subscriber line states. Dial pulses (or off-hook current states) in the subscriber line are then reconstructed and made available to the associated system scan points.

To reduce the number of detection circuits, a conventional concentration based on traffic requirements is readily achieved in carrying out this invention. Advantageously, the necessity of providing the detection circuits on a per-line basis, as is the case in many transformer-coupled solid state network telephone systems, is thus eliminated. Although in the foregoing the examination of a subscriber line for its operational states was summarized, it will be appreciated that each subscriber line may, by the novel arrangement of this invention, also be tested through a solid state network for false cross and ground malfunctions.

BRIEF DESCRIPTION OF THE DRAWING

The organization and operation of this invention together with its objects and features will be better understood from a consideration of the detailed description of one illustrative embodiment thereof which follows when taken in conjunction with the accompanying drawing in which.

DETAILED DESCRIPTION

Figure 1:
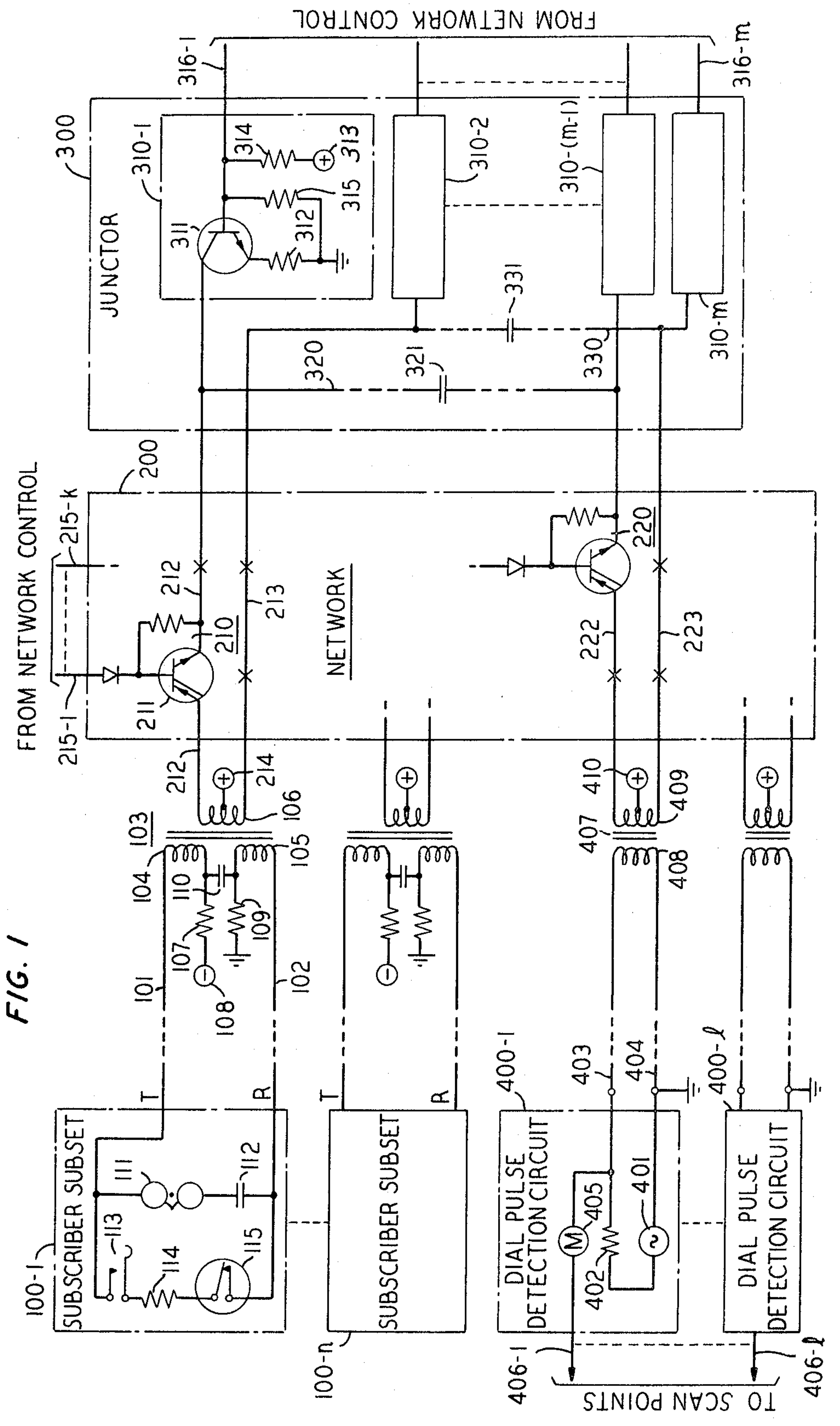
FIG. 1 depicts in schematic form a solid state telephone switching network arrangement providing selected conducting paths between the system subscriber lines and its dial pulse detection circuits.

A telephone system organization incorporating the dial pulse detection circuitry of this invention is shown in FIG. 1 and comprises a plurality of subscriber subsets 100–1 through **100–*n* connected to the line terminals of the system transmission network 200 by means of conventional tip and ring conductors 101 and 102 of a two-wire subscriber line. The coupling of the lines to the network 200 is accomplished via a transformer 103 having a pair of primary windings 104 and 105 and a secondary winding 106. The line circuit connections, described only with respect to representative subscriber subset 100–1, comprise tip conductor 101 connected to one side of winding 104 and therethrough to a line resistor 107 and a source of negative potential 108. The ring conductor 102 is connected to one end of winding 105 and, at the other end, to ground via a line resistor 109. A direct current isolating capacitor 110 connects the other ends of the primary windings 104 and 105. Each of the subsets 100 conventionally comprises a ringing circuit including a ringer 111 and a direct current blocking capacitor 112 in parallel with a hookswitch circuit including normally open hookswitch contacts 113, subset resistance 114, and normally closed dial contacts 115. Although, as will appear hereinafter, the foregoing subscriber line circuitry contemplates a direct current therein upon closure of the hookswitch contacts 113 as initiated by the source 108**, this current is not necessary for the operation of this invention. These circuit details are provided here only for the sake of depicting a conventional transformer coupling including a battery source for providing voice current when a connection has been established.

A solid state switching network of the character contemplated in connection with this invention is well known in the art and is shown in FIG. 1 only in sufficient detail for an understanding of the illustrative embodiment being described. The network 200 comprises a plurality of coordinately arranged crosspoints, representative ones 210 and 220 of which are shown. Each of the crosspoints, as the crosspoint 210, in turn comprises a PNPN thyristor 211 having its anode and cathode connected between row and column conductors to establish a conducting path represented in the drawing for simplicity as conducting path 212. Similar paths are defined in the network by other crosspoints such as the paths 213, 222, and 223. The paths 212 and 213 are assumed as continuing the two-wire line from the transformer 103 secondary winding 106. The paths 212 and 213 terminate at the output side of network 200 at a junctor 300. The latter circuit contains a plurality of holding current sources 310–1 through **310–*m* selectively activated under the control of signals originating at the telephone system network control to provide a conventional holding current for the active crosspoints of the network. Each of the circuits 310, as exemplified by the circuit 310–1, comprises a transistor switch 311 having its collector connected to the path 212 and its emitter connected to ground through a resistor 312. The base is connected to a source of positive potential 313 through a resistor 314. Control inputs are applied to the base across a resistor 315 via a conductor 316–1 of a plurality of conductors 316–1 through 316–*m* extended to the system network control. The latter circuit is not shown in the drawing as not comprising an element of this invention and will be readily envisioned by one skilled in the art. A holding current circuit for the thyristor 211 of crosspoint 210 (and other thyristors of the crosspoints completing the conducting path through the network) is thus completed by transistor 311 and terminates at a source of positive potential 214 connected to a center-tap of secondary winding 106. The holding current circuit thus defined constitutes one of the selection coordinates of the switch array as energized by the selection of one of the sources 310 by network control. The other selection coordinates are defined by column conductors connecting in common the bases of the respective thyristors of the crosspoints associated with a particular column of the switch array. The base of thyristor 211, for example, is connected to a common conductor 215–1 of a plurality of such conductors 215–1 through 215–*k* extended to network control. The latter circuit supplies gating pulses to the thyristors of a selected column to render them simultaneously conductive. Such a gating signal applied to the base of thyristor 211, for example, simultaneously with a holding current from the source 310–1, renders that thyristor conductive and thus selects crosspoint 210 of the network. Other crosspoints in the paths 212 and 213** are selected in an identical and conventional manner to complete these paths. When the column gating pulses are terminated, only the crosspoints having a holding current applied thereto will remain active as is also well known.

The network 200 is shown for purposes of illustration as operated in a "folded" mode, that is, the subscriber lines and service circuit terminations are made at the same side of the network and opposite to that of the junctor 300. In the junctor 300, conducting paths, such as the representative paths 320 and 330, are selectively connected from each of the terminals on the junctor side of the network to any of the other terminals on that side. Capacitors 321 and 331 in the paths 320 and 330, respectively, provide direct current isolation for the folded network 200 and provide protection for the thyristors in the event of false grounds.

On the subscriber line side of the network 200, access is provided for a plurality of dial pulse detection circuits 400–1 through **400–*l*. The latter circuits are shown generally in FIG. 1 as comprising a source of alternating current 401 connected in series with a load resistor 402 across service conductors 403 and 404 extended from the network 200. A measuring circuit means 405 providing output signals representative of the open and closed state of a subscriber line hookswitch circuit is connected to the conductor 403 and measures the current in a coupled subscriber line. An output conductor 406 extends the output of detection circuit 400 to a scanpoint of the system with which this invention may be adapted for use. The coupling of the conductors 403 and 404 to the network 200 conducting path 222–223 is made by means of a transformer 407 having a primary winding 408 and a secondary winding 409. Identical transformer arrangements couple the other dial pulse detection circuits 400–2 through 400–*l* to the network 200. The secondary windings 409 are provided with center-taps for conventionally connecting sources of positive potential 410 terminating the thyristor hold current circuits controlled by the sources 310–1 through 310–*m*** as described in the foregoing.

Figure 2:
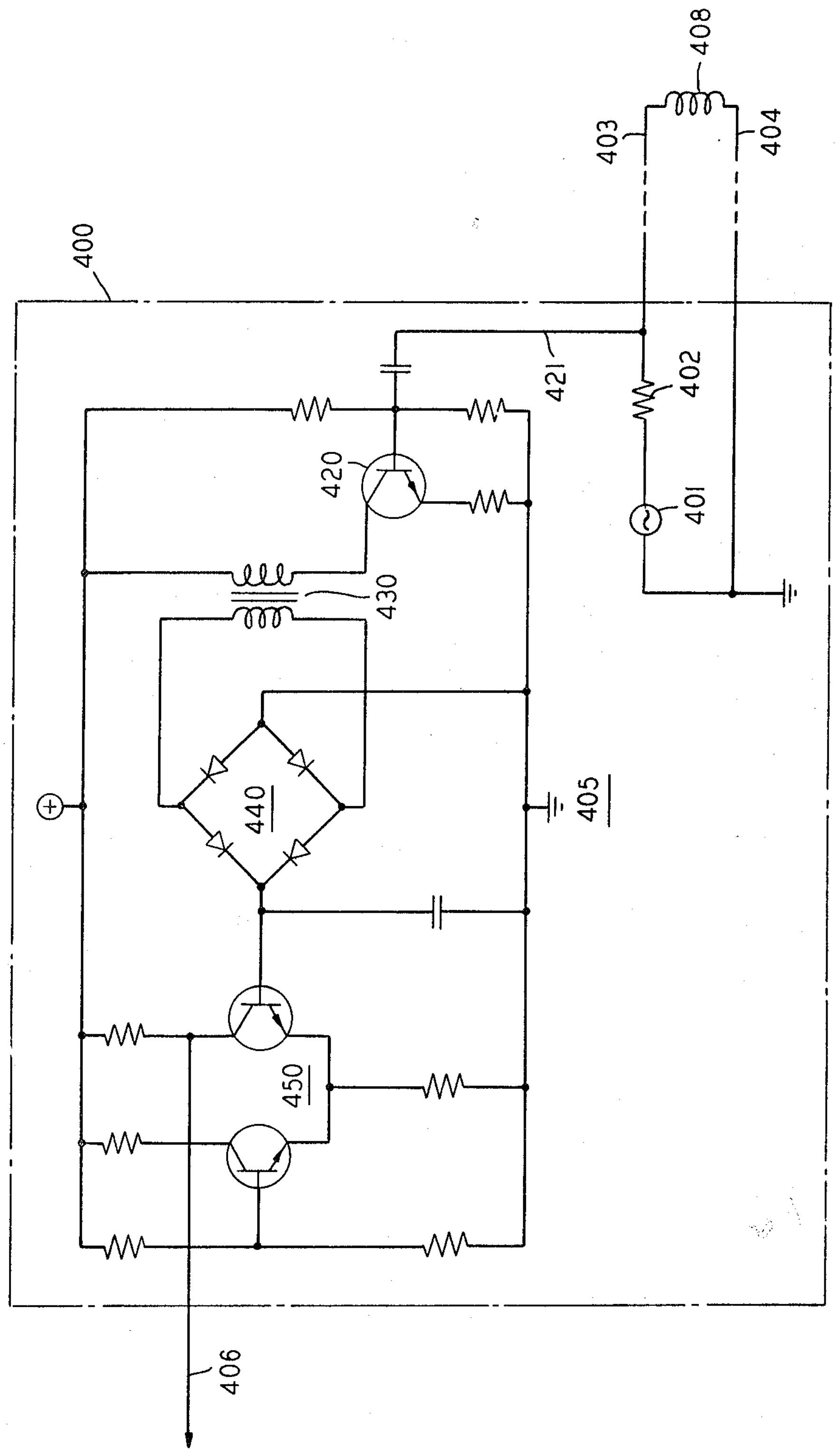
FIG. 2 depicts the circuit details of one specific dial pulse detection circuit which may be employed in the practice of this invention.

Although the detection circuits 400 may comprise any known circuit means for accomplishing the current measuring function and are readily devisable by one skilled in the art, the details of an illustrative such circuit means capable of detecting impedance changes are shown in FIG. 2. An oscillator-amplifier comprising the source 401 is shown as connected in series with the load resistor 402 across the conductors 403 and 404. In order to hold system crosstalk to minimum levels and to prevent the detection of the applied alternating sensing current from the source 401 by a subscriber, the voltage at the output of the latter source is maintained relatively low. Accordingly, the measuring circuit means 405 input is applied to a transistor-amplifier 420 via a conductor 421. An alternating voltage output is taken from the collector of transistor-amplifier 420 and applied via a transformer 430 to a bridge rectifier 440. The rectifier output is applied to one of the stages of a conventional comparator circuit 450. This stage, from which an output is taken for transmission to a scan point via conductor 406, is normally nonconducting and conducts when the sensing current in a subscriber line falls when its hookswitch circuit is opened. A voltage divider provides a reference for the other stage of comparator 450 of a level to ensure that the small current in the subscriber line, when the hookswitch circuit is open, as the result of its inherent capacitance, does not switch the comparator and generate a spurious output signal. While the organization of a telephone switching system thus described employs a folded network arrangement and utilizes solid state crosspoints, it will be apparent that the principles of this invention are equally applicable to networks organized in other configurations and employing other and different crosspoint elements albeit presenting similar direct current blocking transformer coupling problems.

For purposes of describing an illustrative operation of the dial pulse detection arrangement shown in the drawing, it will be assumed that the system network control has enabled the crosspoints 210 and 220 (and other applicable crosspoints in the network 200) to establish an alternating current conducting path between the subscriber subset 100–1 and the dial pulse detection circuit 400–1. The current sources **310–1, 310–2, 310–(*m*–1) and 310–*m* are activated to accomplish this simultaneously with the application of gating pulses to the bases of the applicable thyristors. The line relay contacts conventionally transferring the subscriber subset 100–1 tip and ring conductors from its supervisory circuit to the network 200 are not shown in the drawing for the sake of simplicity. It is further assumed, however, that this transfer has been made in the usual manner. As a result, when the hookswitch contacts 113 are closed by a subscriber preparatory to dialing a called directory number, a circuit is completed through the subset 100–1 including the potential source 108. The direct current present in the subscriber line at this time as a result of the closure of contacts 113** is not of direct concern to the description of an operation of this invention as previously mentioned. Reference to the subscriber line interconnections with the transmission network is here detailed only to demonstrate that no changes are required therein from a conventional arrangement in the practice of this invention.

Assuming a connection between subscriber subset 100–1 and network 200, if at any time the hookswitch-dial contact circuit is open, it will be recalled that some alternating current from the source 401 at detection circuit 400–1 is drawn by a subscriber line due to its inherent capacitance. Thus, a current is measurable in the resistor 402 by the circuit means 405, the magnitude being determined by the relatively high impedance seen by the source 401. An output signal generated by the circuit 405 based on detection of the magnitude of the sensing current is transmitted via conductor 406–1 to a system scan point as indicative of the open state of subset 100–1. When the hookswitch contacts 113 (and dial contacts 115) are closed, the sensing current from the source 401 finds a completed alternating current path, this path, in the illustrative operation being described, being traced via conductors 403 and 404, transformer 407, network 200 via the two-wire conducting paths 222 and 223, junctor paths 320 and 330, network paths 212 and 213, transformer 103, tip and ring conductors 101 and 102, dial contacts 115, resistance 114, and hookswitch contacts 113. The sensing current in the foregoing circuit is now limited only by the relatively low impedance seen by the source 401 as determined by the aforementioned inherent capacitance of the subscriber line, resistance of the subscriber line, and its included subset resistance 114. The substantial increase in current level as a result is detected by the circuit means 405 where the output signal now generated is transmitted to a system scan point as indicative of the off-hook state of subset 100-1. The latter current level will obviously be maintained as long as hookswitch and dial contacts 113 and 115 are closed. This current level will be periodically interrupted as the dialing operation is continued, the changes in current being drawn by the subscriber line also appearing in resistor 402. Output signals generated at circuit 405 indicative of the sensing current level interruptions are transmitted to the system scan point as previously described. When dialing is completed, the sensing current returns to its normal, off-hook level and remains there until such time as the call is completed and subset 100-1 returns to its on-hook state.

What has been described is considered to be only an illustrative embodiment of this invention and it is to be understood that various and numerous other arrangements may be devised by one skilled in the art without departing from the spirit and scope of the invention as defined by the accompanying claims.

What is claimed is:

1. In a telephone system, in combination, a plurality of subscriber lines each including a tip and ring conductor and each having a subset circuit including a hookswitch and dial contacts connected across one end of said tip and ring conductors, a transmission switching network comprising a plurality of pairs of conducting paths therethrough and a coordinate array of semiconductor cross-point devices for selectively defining said pairs of conducting paths; a plurality of first transformer means for coupling, respectively, the other ends of said tip and ring conductors to one end of said pairs of conducting paths, a plurality of detection circuits, and a plurality of second transformer means for coupling, respectively, said plurality of detection circuits to the other ends of said pairs of conducting paths, each of said detection circuits comprising a source of alternating current for applying an alternating sensing current to the subset circuits of said subscriber lines and means for measuring the magnitude of said sensing current when both said hookswitch and dial contacts are closed and when either said hookswitch contacts or said dial contacts are open.

2. A supervisory circuit arrangement for a telephone system having a transmission network including a coordinate array of semiconductor cross-point devices operable for selectively establishing a plurality of conducting paths between a first plurality of terminals of said network and a second plurality of terminals of said network and a plurality of subscriber lines each having a hookswitch and dial contacts therein, said subscriber lines being transformer-coupled respectively to said first plurality of terminals of said network, said supervisory circuit arrangement comprising a plurality of alternating current sources transformer-coupled respectively to said second plurality of terminals of said network for selectively applying an alternating sensing current through said network to selected lines of said plurality of subscriber lines, means associated with each of said plurality of alternating current sources for measuring the magnitude of said sensing current when both said hookswitch and said dial contacts of said selected lines are closed and when either said hookswitch or said dial contacts of said selected lines are open, and means associated with each of said plurality of alternating current sources for generating an output signal indicating the magnitude of said sensing current.

3. In a telephone system, in combination, a plurality of subscriber lines each terminating at one end in a subset circuit including dial contacts, each of said lines presenting a predetermined impedance when said contacts are open, a transmission switching network comprising a coordinate array of semiconductor crosspoint elements for selectively defining a plurality of conducting paths therethrough between a first and a second plurality of terminals of said network, a plurality of transformer means for coupling, respectively, the other ends of said plurality of subscriber lines to said first plurality of terminals of said network, a source of alternating current for applying an alternating sensing current to a selected one of said second plurality of terminals terminating a selected one of said conducting paths through said network, and means for detecting the magnitude of said sensing current and for generating an output signal indicative of said magnitude when a subscriber line coupled to said selected conducting path presents said predetermined impedance.

* * * * *